May 13, 1958 G. L. CLAPPER 2,834,880

PULSE GENERATOR

Filed April 6, 1953 2 Sheets-Sheet 1

INVENTOR.
GENUNG L. CLAPPER

BY John P. Doity
ATTORNEY

May 13, 1958 G. L. CLAPPER 2,834,880

PULSE GENERATOR

Filed April 6, 1953 2 Sheets-Sheet 2

INVENTOR.
GENUNG L. CLAPPER

BY John P. Dority
ATTORNEY

United States Patent Office 2,834,880
Patented May 13, 1958

2,834,880

PULSE GENERATOR

Genung L. Clapper, Vestal, N. Y., assignor to International Business Machines Corporation, New York, N. Y., a corporation of New York Application April 6, 1953, Serial No. 346,941

4 Claims. (Cl. 250—27)

This invention relates to pulse generating circuits and more particularly to externally actuated electronic pulse generating circuits.

In digital computer applications it is often desirable to accurately generate pulses of predetermined durations from pulses having durations differing from the desired predetermined durations. It may be desirable to generate a single pulse of predetermined duration from a single pulse of random duration or it may be desirable to generate a single pulse of a duration determined by a specific number of other pulses. The latter is sometimes called frequency division. Heretofore difficulty has been had in generating accurately terminated pulses from pulses of random durations. In the past pulse generators incorporating feed-back loops have had the disadvantage that capacitive loading on the input circuit has produced a delayed or shifting voltage setting for the RC network of the pulse generator.

It is an object of this invention to provide an improved pulse generator.

Another object of this invention is to provide an improved pulse generator for generating accurately initiated and terminated pulses of predetermined durations from pulses of random durations.

A more specific object of this invention is to provide an improved pulse generator for generating pulses of durations determined by specific numbers of other pulses.

Another more specific object of this invention is to provide an improved frequency divider.

Another object of this invention is to provide an improved pulse generator wherein a generated pulse is affected a minimum by capacitive loading on the output circuit.

Other objects of the invention will be pointed out in the following description and claims and illustrated in the accompanying drawings, which disclose, by way of examples, the principle of the invention and the best mode, which has been contemplated, of applying that principle.

Figure 1:
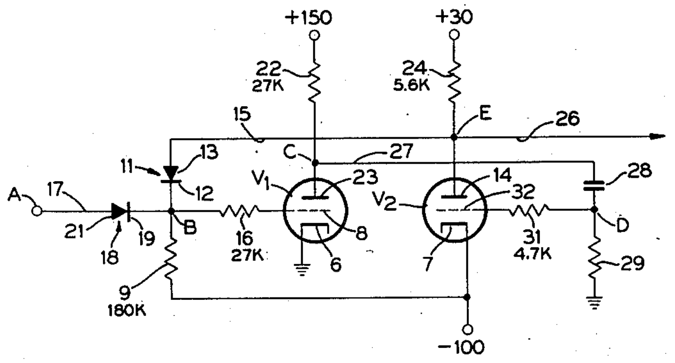
Fig. 1 is a schematic diagram of a pulse generator made in accordance with this invention and adapted to generate a single pulse of predetermined duration from a single pulse of different duration.

Referring to the drawings there is shown in Fig. 1 a pulse generator including tubes V1 and V2. Tube V1 has its cathode 6 grounded while tube V2 has its cathode 7 conected to the negative side of a power supply indicated as −100 volts. The grid 8 of tube V1 is connected through resistor 9 to the negative side of the power supply and through a rectifier, shown as a germanium diode 11 having a cathode 12 and an anode 13, over lead 15, and to the plate or anode 14 of tube V2. A grid current limiting resistor 16 is provided between the grid 8 of tube V1 and the junction B of resistor 9 and diode 11. An input terminal A on an input line 17 is connected through a rectifier, shown as a germanium diode 18 having a cathode 19 and an anode 21, to the junction B of resistor 9 and diode 11, and thus to the grid 8 of tube V1. A resistor 22 is provided in the anode circuit of tube V1 between the plate or anode 23 of tube V1 and the positive side of a power supply indicated as +150 volts, and a resistor 24 is provided in the plate circuit of tube V2 between the plate 14 of tube V2 and a +30 volt power supply. The output of the pulse generator is taken from the junction E of resistor 24 and plate 14 of tube V2 over line 26. Junction E is also the junction of diode 11 with resistor 24 and plate 14 of tube V2. Junction C between resistor 22 and plate 23 of tube V1 is connected by lead 27 to a condenser 28. Condenser 28 is connected in series with a resistor 29 to form an RC network. The side of resistor 29 remote from condenser 28 is shown connected to ground. Junction D between condenser 28 and resistor 29 is connected through a grid current limiting resistor 31 to the grid 32 of tube V2.

In operation tube V2 is normally highly conductive and drawing a heavy grid current to give a diode action between grid 32 and cathode 7. This diode action maintains junction D at a potential near the −100 volt power supply, as shown at D in Fig. 3, if resistor 29 is relatively large compared to resistor 31. Condenser 28 is thus normally charged to a voltage equal to the difference between the voltages at junction D and junction C. With tube V2 conducting the potential at junction E is dropped across resistor 24 to approximately −30 volts.

Figure 3:
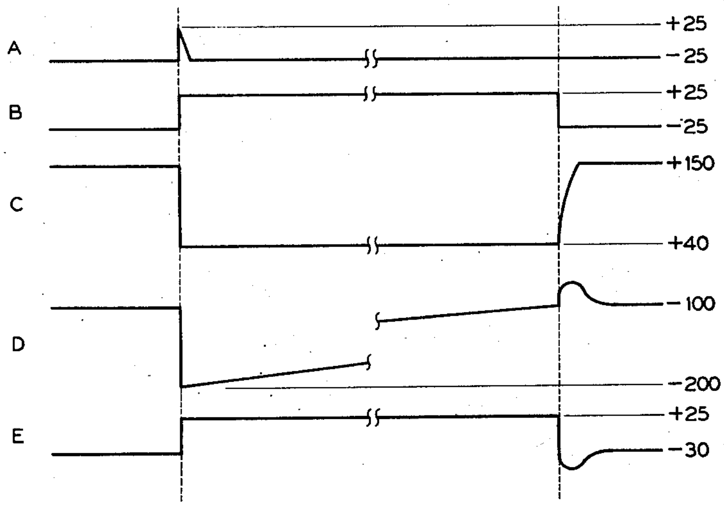
Fig. 3 is a schematic showing of wave forms occurring at various points throughout the diagram shown in Fig. 1 where the generated pulse is of longer duration than the pulse from which it was generated, these various points being designated by the same alphabetic characters as the wave form appearing thereat.

As shown at A in Fig. 3 the input level at point A on input line 17 is maintained at −25 volts and an input signal is shown as going from −25 volts to +25 volts. Junction B will be held at a potential level determined by the potential of point A or the potential of junction E, whichever is higher. This is so because of the action of diodes 11 and 18. With the example of voltages shown in Figs. 1 and 3 the potential at junction B will normally be maintained at approximately −25 volts to normally maintain tube V1 non-conductive.

The positive-going pulse shown at A in Fig. 3 is applied through diode 18 directly to grid 8 of tube V1 to immediately render tube V1 conductive and cause a potential drop at junction C. The drop in potential at junction C is coupled through condenser 28 to lower junction D in potential to approximately −200 volts, as shown at D in Fig. 3. The drop in potential at junction D renders tube V2 non-conductive causing junction E to rise in potential toward the +30 volt power supply. It is to be noted that the above mentioned conditions are brought about by the input pulse and are independent of the loading on line 26. The circuit in parallel with tube V2, from junction E through diode 11, resistor 16, and grid to cathode of tube V1, now highly conductive, draws sufficient current to limit junction E to approximately +25 volts, as shown at E in Fig. 3. The rise in potential at junction E is fed back over lead 15 and through diode 11 to junction B to maintain tube V1 highly conductive even though the input pulse through diode 18 should terminate. The input pulse thus effects a potential drop at junction C and this potential drop is maintained after the termination of the input pulse by the coupling from junction E to the grid of tube V1. The forward conduction of diode 11 connects junction B to junction E through only a small impedance and the high back impedance of diode 18 isolates line 17, if at a lower potential than junction E, from junction B. With tube V1 highly conductive, incoming signals or pulses on input line 17 will have little or no effect on the potential at plate 23 of tube V1. Thus, the output of the pulse generator will be unaffected by input signals while tube V1 is conductive. The potential at junction C is held relatively fixed by the conduction of tube V1 under the influence of the feedback through the feedback circuit including diode 11.

After tube V1 is rendered conductive and junction D is lowered in potential to approximately —200 volts, junction D will begin to rise toward ground potential from the —200 volt level. The circuit for the discharge of condenser 28 will be from ground, through resistor 29, junction D, condenser 28, lead 27, through tube V1 and back to ground. Since the impedance of tube V1 is small when tube V1 is conductive compared to resistor 29, the rise in potential at junction D will be a nearly ideal exponential one.

As junction D nears the —100 volt potential level, tube V2 will again conduct to lower the potential level at junction E and terminate the output pulse. Thus junction B will no longer be held up by the feed-back circuit including diode 11, but will be brought down in potential by the negative side of the power supply through resistor 9 to a level where input line 17 again takes control. From the above it may be seen that the duration of an output pulse is dependent only upon the time constant of the RC network including condenser 28 and resistor 29 and the setting of the potential at junction C. The condenser 28 might have the value of .03 mfd. and resistor 29 might have the value of 510K ohms to give the wave forms shown in Fig. 3. Values of condenser 28 and resistor 29 may be altered as required to give an output pulse of desired duration. Output pulses ranging in durations from .5 microsecond to 12 seconds have been produced by giving the required values to condenser 28 and resistor 29, and these durations did not appear to approach the limits of the pulse generator. The duration of the input pulse has no effect on the duration of the output pulse. As pointed out above the input pulse set the voltage at junction C and simultaneously initiated the output pulse. Since the setting of the voltage at junction C determines the potential level from which junction D rises under the influence of the RC network, tube V2 will become conductive to terminate an output pulse at a time, after the leading edge of an input pulse, determined solely by the time constant of the RC network. The input pulse thus sets a stabilized reference voltage for the RC network. It is thus seen that the initiation and termination of an output pulse from the pulse generator is independent of loading on the output line.

Figure 4:
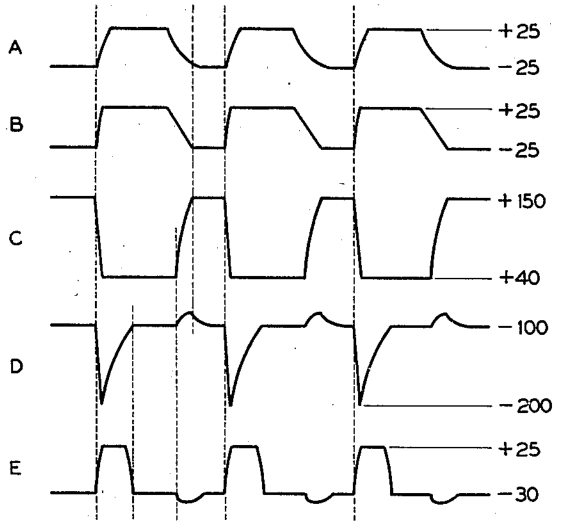
Fig. 4 is a schematic showing of wave forms corresponding to those shown in Fig. 3 where the generated pulse is of shorter duration than the pulse from which it was generated.

Referring to Fig. 4, wave forms are shown where the input pulse is of longer duration than the output pulse. These wave forms relate to points indicated by corresponding alphabetic characters in Fig. 1.

The operation of the circuit in Fig. 1 is the same with the wave forms shown in Fig. 4 as with the wave forms shown in Fig. 3 except that with values of resistor 28 and condenser 29 altered to give output pulses, shown as E in Fig. 4, of shorter durations than the input pulses, shown as A in Fig. 4, junction B will remain at approximately +25 volts after tube V2 has resumed conduction. The low forward impedance of diode 18 connects junction B to line 17 so that the voltage at junction B is determined by line 17. However, as tube V2 conducts, the voltage at junction E drops to terminate the output pulse, and junction E is isolated from junction B by diode 11. It is thus seen that an accurately initiated and terminated output pulse is generated of duration independent of the duration of an input pulse regardless of whether the output pulse is of longer or shorter duration than the input pulse.

Figure 2:
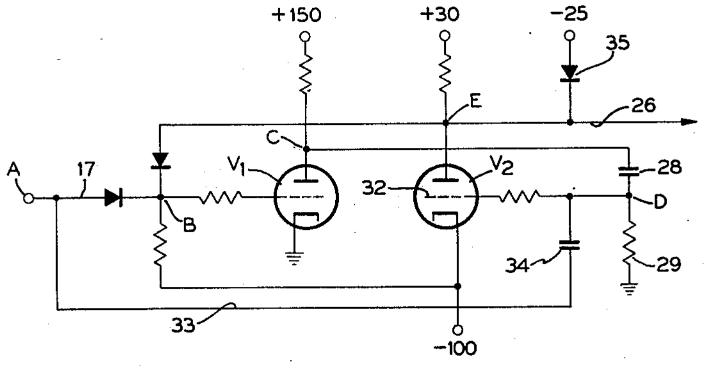
Fig. 2 is a schematic diagram of a pulse generator made in accordance with this invention and adapted to generate a single pulse from a specific number of other pulses.
Figure 5:
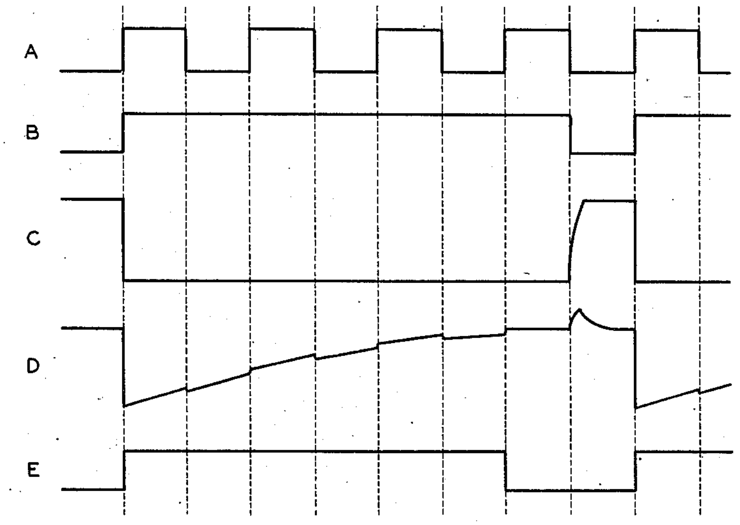
Fig. 5 is a schematic showing of wave forms occurring at various points throughout the diagram shown in Fig. 2, these various points being designated by the same alphabetic characters as the wave forms appearing thereat.

Referring to Fig. 2 there is shown a pulse generator as shown in Fig. 1 with corresponding parts bearing the same reference characters. The pulse generator in Fig. 2 is shown connected to operate as a frequency divider. The input terminal A on the input line 17 is coupled by line 33 and condenser 34 to the junction D between resistor 29 and condenser 28. The input pulses, shown at A in Fig. 5, are coupled to junction D and thus to the grid 32 of tube V2. In this case the RC time constant of the network including resistor 29 and condenser 28 is made slightly longer than is required for the desired output pulse length. As point D rises from the level around —200 volts toward ground the pulses shown at A in Fig. 5 are applied to junction D through condenser 34. When the potential at junction D has risen to a critical value near the potential necessary to cause tube V2 to conduct, a positive pulse applied through condenser 34 to junction D will raise junction D sufficiently to start conduction in tube V2 to terminate the output pulse from junction E, shown at E in Fig. 5. The input pulses are thus serving as synchronizing pulses for the pulse generator in the circuit shown in Fig. 2. An independent source of synchronizing pulses, not shown, might be advantageously substituted for the input pulses on line 33 in some applications. It is assumed that the pulses shown at A in Fig. 5 are relatively uniformly spaced, if the frequency division is to be accurate. The RC time constant of the network including condenser 28 and resistor 29 determines when the critical voltage at junction D is reached after which a positive pulse applied to junction D will cause tube V2 to conduct. By varying this RC time constant the number of uniformly spaced pulses appearing on line 17 required to give a single output pulse at junction E may be varied. A frequency divider is thus provided wherein a specific number of uniformly spaced input pulses are made to produce a single output pulse. The duration of the output pulse will be determined by the time between the leading edges of the first and last of the specific number of input pulses required for a single output pulse.

It may be desirable to eliminate the negative overshoot at junction E occurring when tube V1 is cut off. This may be accomplished by providing a clamping circuit for the output line 26. This clamping circuit may consist of a negative voltage supply shown as —25 volts connected through a diode 35 to line 26.

It is to be understood that the potential levels and the values of the several circuit components utilized in describing and illustrating the invention are only by way of example and that changes therein to fit individual requirements do not constitute departures from the inventive concept.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse generator comprising in combination first and second vacuum tubes each having at least an anode and a control electrode, a condenser connected between the anode of said first vacuum tube and the control electrode of said second vacuum tube, a resistor connected between the control electrode of said second vacuum tube and a point of reference potential, a first rectifier connected between the anode of said second vacuum tube and the control electrode of said first vacuum tube for impressing rises in potential at the anode of said second vacuum tube on the control electrode of said first vacuum tube, an input terminal for receiving input pulses, and a second rectifier connected between said input terminal and the control electrode of said first vacuum tube.

2. A pulse generator comprising in combination first and second vacuum tubes each having at least an anode and a control electrode, a condenser connected between the anode of said first vacuum tube and the control electrode of said second vacuum tube, a resistor connected between the control electrode of said second vacuum tube and a point of reference potential, a first rectifier having a cathode conductively connected to the control electrode of said first vacuum tube and an anode conductively connected to the anode of said second vacuum tube for impressing rises in potential at the anode of said second vacuum tube on the control electrode of said first vacuum tube, an input terminal for receiving input pulses, and a second rectifier having an anode conductively connected to said input terminal and a cathode conductively connected to the control electrode of said first vacuum tube.

3. A pulse generator comprising in combination first and second vacuum tubes each having at least an anode and a control electrode, an output circuit for each of said vacuum tubes including an anode resistor, a condenser connected between the anode of said first vacuum tube and the control electrode of said second vacuum tube, a resistor connected between the control electrode of said second vacuum tube and a point of reference potential, a first rectifier having a cathode conductively connected to the control electrode of said first vacuum tube and an anode conductively connected to the anode of said second vacuum tube for impressing rises in potential at the anode of said second vacuum tube on the control electrode of said first vacuum tube, an input terminal for receiving input pulses, and a second rectifier having an anode connected to said input terminal and a cathode connected to the control electrode of said first vacuum tube.

4. A pulse generator comprising in combination first and second vacuum tubes each having at least an anode and a control electrode, a condenser connected between the anode of said first vacuum tube and the control electrode of said second vacuum tube, a resistor connected between the control electrode of said second vacuum tube and a point of reference potential, a first rectifier connected between the anode of said second vacuum tube and the control electrode of said first vacuum tube for impressing rises in potential at the anode of said second vacuum tube on the control electrode of said first vacuum tube, an input terminal for receiving input pulses, a second rectifier connected between said input terminal and the control electrode of said first vacuum tube, and capacitive coupling between said input terminal and the control electrode of said second vacuum tube.

References Cited in the file of this patent

UNITED STATES PATENTS

| | | |
|---|---|---|
| 2,399,135 | Miller et al. | Apr. 23, 1946 |
| 2,478,683 | Bliss | Aug. 9, 1949 |
| 2,502,687 | Weiner | Apr. 4, 1950 |
| 2,551,104 | Dickinson | May 1, 1950 |
| 2,629,825 | Eckert, et al. | Feb. 24, 1953 |
| 2,683,806 | Moody | July 13, 1954 |
| 2,709,747 | Gordon et al. | May 31, 1955 |